United States Patent Office 2,865,954
Patented Dec. 23, 1958

2,865,954
MIXED ESTERS OF PENTAERYTHRITOL

Henry C. Dehm, Wilmington, Del., assignor to Hercules Powder Company, Wilmington, Del., a corporation of Delaware No Drawing. Application August 5, 1957
Serial No. 676,357

4 Claims. (Cl. 260—486)

The present invention relates to polymerizable mixed esters of pentaerythritol having special utility as plasticizers for vinyl chloride plastisols.

Dispersions of finely-divided vinyl chloride resins suspended in liquid plasticizers have been known for several years under the term "plastisols." These dispersions are fluid at ordinary temperatures but on heating and subsequent cooling they are converted to solid, elastomeric compositions due to solvation of the dispersed resin particles by the resin plasticizer. When the plasticizer ingredient of such compositions consists of an unpolymerizable material, elastomers prepared from the plastisol are inherently very flexible because the amount of plasticizer required is comparatively high.

More recently, it has been proposed to employ an unsaturated polymerizable material as a portion of the plasticizer in vinyl chloride plastisols. In the liquid state, this unsaturated polymerizable material serves in the roll of dispersant for the suspended particles of the vinyl chloride resin but on heating it polymerizes. Thereafter, on cooling the gelled mass, the polymerized ester forms part of the colloidal composition but it is less effective as a plasticizer than the usual known polymerizable plasticizers and consequently the resulting elastomer is stiffer.

The vast majority of the known liquid polymerizable materials are unsuitable as components of vinyl chloride plastisols because they do not meet the requirements of such a plasticizer, e. g., compatibility, solvency and polymerizability. Certain compounds, however, which have been found to be highly advantageous for such use are the methacrylic diesters of liquid polyethylene glycols. Such compounds, in fact, have been manufactured and sold in fairly large quantities for this purpose.

In accordance with the present invention, there is provided a novel class of esters which have particular utility as polymerizable plasticizers in vinyl chloride plastisols and which even surpass, in some respects, the known methacrylic diesters of liquid polyethylene glycols. The novel esters of the invention are mixed esters of pentaerythritol in which an average of from 0.5 to 2.5 hydroxyl groups are esterified with acrylic or methacrylic acid and an average of from 1.5 to 3.5 hydroxyl groups are esterified with a saturated aliphatic monocarboxylic acid having from 2 to 10 carbon atoms.

The esters of the invention are also distinguishable from other prior art esters. For instance, normal esters of pentaerythritol and methacrylic acid and normal esters of pentaerythritol and saturated aliphatic monocarboxylic acids, e. g., butyric acid, are known. However, these known compounds do not possess the utility that is possessed by the esters of the invention. Quite obviously, the normal esters of pentaerythritol and a saturated acid are not polymerizable and for this reason obviously behave quite differently as plasticizers in vinyl chloride plastisols. On the other hand, the normal esters of pentaerythritol and methacrylic acid, while being polymerizable, present compatibility problems and give rise to plastisols of such high viscosity as to be impracticable for such use. Thus, the esters of the invention possess a very outstanding utility which is not shared by the most closely related esters of the prior art.

The esters of the invention are conveniently prepared by the direct esterification of pentaerythritol with acrylic or methacrylic acid and a saturated aliphatic monocarboxylic acid having from 2 to 10 carbon atoms, preferably in the presence of a ploymerization inhibitor such as copper.

The following examples illustrate the preparation of various esters within the scope of the invention and further illustrate their use in vinyl chloride plastisols. All parts and percentages are by weight unless otherwise specified. In the analysis of the various products, molecular weight was determined cryoscopically in benzene. Bromine numbers were obtained either by the pyridine sulfate dibromide method or by hydrogen adsorption in ethanol in the presence of a palladium catalyst.

Example 1

Into a reaction vessel equipped with an agitator, a thermometer, water separator, and inert gas inlet there was charged 1362 parts of nitration-grade pentaerythritol (1 mole), 2583 parts of methacrylic acid (3 moles), 1762 parts of butyric acid (2 moles), 7 parts of powdered copper, 2.3 parts of hydroquinone, 21 parts of concentrated sulfuric acid, and 432 parts of toluene. This mixture was sparged with carbon dioxide and then heated over a period of about 80 minutes to a temperature of 152° C. Heating was then stopped and the temperature decreased gradually over a period of 30 minutes to 100° C. During the heat-up and cool-down operation, the water evolved was separated from toluene in the water separator. At this point approximately 554 parts of water had been collected in the water separator and heat was shut off. The reaction mixture was then allowed to cool to a temperature of 100° C. over a period of one-half hour during which time 35.8 parts of sodium acetate was stirred into the mixture. The water separator was then replaced with a distillation head and condenser connected to a source of vacuum and the reaction mixture was concentrated under a vacuum of from 29 to 39 millimeters of mercury until 1336 parts of a colorless distillate was obtained. There remained in the reaction vessel a mixture of clear oil and powdered copper amounting to a total of 431.3 parts.

The mixture in the reaction vessel was next filtered through a sintered glass funnel at 70° C. The filter cake containing recovered copper was washed with ether and the clear filtrate, now diluted to about twice its original volume with ether, was cooled by adding cracked ice. Unreacted acid was removed by extracting several times with 5 N sodium hydroxide. The resulting neutral product in the ether layer was washed with brine, dried over anhydrous sodium sulfate and filtered through a thin bed of diatomaceous earth. One part of hydroquinone was dissolved in the clear filtrate and it was concentrated to constant weight on a rotary evaporator over a period of one-half hour. The product in the amount of 3280 parts was a pale yellow liquid with a viscosity of 85 centipoises and a pleasant odor. Analysis of the product was as follows:

| Molecular Weight | Saponification Number | Bromine Number | Hydroxyl Number |
|---|---|---|---|
| 334, 335 | 486, 487 | 55, 55 | 4.55, 4.56 |

This data indicate a mixed ester of pentaerythritol having an average of about 1.2 hydroxyls esterified by methacrylic acid and about 1.8 hydroxyls esterified by butyric acid.

Example 2

The apparatus and the initial reaction mixture were the same as in the preceding example with the exception that only one-half (881 parts) of the butyric acid was charged initially. The reaction mixture was heated over a period of an hour to 144° C. at which point the remaining 881 parts of butyric acid was added. Heating was continued until at the end of 83 minutes the reaction mixture reached a temperature of 150° C. at which time 613 parts of water had been evolved. The heating was then turned off and the reaction mixture was cooled over a period of 62 minutes to a temperature of 30° C. with 35.8 parts of sodium acetate being added midway during the cooling period.

The product was worked up as in the preceding example. It was a pale yellow, pleasant smelling liquid with a viscosity of 115 centipoises and amounted to 3677 parts. Analysis of the product was as follows:

| Molecular Weight | Saponification Number | Bromine Number | Hydroxyl Number |
|---|---|---|---|
| 364, 381 | 508, 511 | 53, 54 | 2.25, 2.27 |

The analysis shows a mixed ester of pentaerythritol having an average of about 1.35 hydroxyls esterified by methacrylic acid and about 2.15 hydroxyls esterified by butyric acid.

Example 3

The apparatus and materials used in this example were the same as in Example 1 except that no butyric acid was charged initially. The reaction mixture was heated to a temperature of 141° C. over a period of 64 minutes at which time the butyric acid (1762 parts) was added. Heating was continued until at the end of 95 minutes the reaction temperature reached 151° C. at which time 626 parts of water had been evolved. The reaction mixture was then cooled over a period of 55 minutes to a temperature of 35° C. with 35.8 parts of sodium sulfate being added midway during the cooling period.

The product was worked up as in Example 1 and amounted to 3484 parts of a pale yellow liquid having a viscosity of 125 centipoises. Analysis of the product was as follows:

| Molecular Weight | Saponification Number | Bromine Number | Hydroxyl Number |
|---|---|---|---|
| 381, 379 | 516, 520 | 92, 93 | 1.89, 1.88 |

The analysis indicates a mixed ester of pentaerythritol having an average of about 2.2 hydroxyls esterified by methacrylic acid and about 1.3 hydroxyls esterified by butyric acid.

Example 4

The apparatus and procedure in this example were the same as in Example 1 except that all of the butyric acid was replaced with an equal amount of caproic acid and the amount of concentrated sulfuric acid was reduced to 18.8 parts and the amount of toluene increased to 562 parts.

Work-up of the product as in Example 1 yielded 3530 parts of a pale yellow liquid having a viscosity of 65 centipoises. Analysis of the product was as follows:

| Molecular Weight | Saponification Number | Bromine Number | Hydroxyl Number |
|---|---|---|---|
| 405, 419 | 411, 412 | 39 | 4.58 |

The analysis indicates a mixed ester of pentaerythritol having an average of about 0.95 hydroxyl group esterified by methacrylic acid and about 2.1 hydroxyl groups esterified by caproic acid.

Example 5

The apparatus and ingredients for this example were the same as in Example 4. The general procedure of Example 2 was followed with half the caproic acid being charged initially with the remainder of the caproic acid being added when the reaction temperature had reached about 140° C.

The recovery of product as in preceding examples gave 2980 parts of a pale yellow liquid having a viscosity of 75 centipoises. Analysis of this product was as follows:

| Molecular Weight | Saponification Number | Bromine Number | Hydroxyl Number |
|---|---|---|---|
| 404, 405 | 427, 428 | 53, 54 | 4.24, 4.15 |

This analysis indicates a mixed ester of pentaerythritol having an average of about 1.25 hydroxyls esterified by methacrylic acid and about 1.85 hydroxyls esterified by caproic acid.

Example 6

The apparatus and ingredients were the same as in Example 4. The general procedure of Example 3 was followed with the caproic acid being added when the reaction temperature reached about 140° C.

Work-up of the product as in preceding examples yielded 3410 parts of a pale yellow liquid having a viscosity of 100 centipoises. Analysis of the product was as follows:

| Molecular Weight | Saponification Number | Bromine Number | Hydroxyl Number |
|---|---|---|---|
| 413 | 460, 462 | 82, 82 | 2.75, 2.74 |

This analysis indicates a mixed ester of pentaerythritol having an average of about 1.9 hydroxyls esterified by methacrylic acid and about 1.5 hydroxyls esterified by caproic acid.

Example 7

The apparatus, procedure, and ingredients were the same as in Example 1 with the exception that the butyric acid of Example 1 was replaced with an equimolar amount of a mixture of caprylic and caproic acids in the ratio of about 3:2, the mixture having an average molecular weight of 153.4.

Work-up of the product as in Example 1 yielded 4185 parts of a yellow liquid having a viscosity of 65 centipoises. Analysis of the product was as follows:

| Molecular Weight | Saponification Number | Bromine Number | Hydroxyl Number |
|---|---|---|---|
| 486, 484 | 367, 369 | 41, 38 | 2.85, 2.88 |

This analysis indicates a mixed ester of pentaerythritol having an average of about 1.2 hydroxyls esterified by methacrylic acid and about 2 hydroxyls esterified with caprylic and caproic acids.

Example 8

The apparatus and ingredients for this example were the same as in Example 1 except that in place of methacrylic acid, 2162 parts of acrylic acid (3 moles) was used and the reaction was carried out over a period of 70 minutes to a temperature of 150° C. After the usual work-up there was obtained 3347 parts of a pale yellow liquid with a viscosity of 75 centipoises. Analysis showed that the mixed ester of pentaerythritol had an average of about 1.4 hydroxyls esterified by acrylic acid and about 1.8 hydroxyls esterified by butyric acid.

*Example 9*

The apparatus and procedure in this example were the same as in Example 8 except that only one-half (881 parts) of the butyric acid was charged initially. The reaction mixture was heated over a period of 55 minutes to 143° C. at which point the remaining 881 parts of butyric acid was added. Heating was continued until at the end of 80 minutes the reaction mixture reached a temperature of 148° C. at which time 652 parts of water had been evolved. After the usual work-up, there was obtained 3530 parts of a yale yellow liquid having a viscosity of 105 centipoises. Analysis showed the product to be a mixed ester of pentaerythritol having an average of about 2.5 hydroxyls esterified by acrylic acid and about 1.2 hydroxyls esterified by butyric acid.

As previously stated, the esters of the invention are mixed esters of pentaerythritol in which an average of from about 0.5 to 2.5 hydroxyl groups are esterified with acrylic or methacrylic acid and an average of from about 1.5 to 3.5 hydroxyl groups are esterified with a saturated aliphatic monocarboxylic acid having from 2 to 10 carbon atoms. The numerical limits on the extent of esterification are not sharply critical but nevertheless are fairly well defined. For example, an ester prepared from pentaerythritol and methacrylic acid in which an average of 2.5 hydroxyl groups of the pentaerythritol are esterified provides a plastisol having an initial viscosity of about 87,000 centipoises when the ester is used in an amount equal to the weight of vinyl chloride resin. On the other hand, the ester of Example 1 provides a plastisol with an initial viscosity of about 2,300 centipoises when used in an equal amount with the same resin. Additionally, an ester having a methacrylic acid content lower than the minimum specified, or a saturated aliphatic acid content higher than specified, does not exhibit satisfactory tendency to polymerize and the use of such esters as plasticizers for vinyl chloride plastisols is therefore impractical.

As has been demonstrated in the examples, the novel mixed esters of the invention, which are liquids of relatively low viscosity, can be prepared conveniently by direct esterification, preferably in the presence of a polymerization inhibitor such as copper. The preparation of the esters is suitably controlled to give a desired product by the relative amounts of acrylic or methacrylic acid and saturated aliphatic acid employed and by timing the addition of the latter. A particularly convenient method which is useful for controlling the composition of the product ester is that illustrated by Example 3 wherein pentaerythritol is reacted with an excess of acrylic or methacrylic acid until the desired number of moles of water have been evolved and then an excess of saturated aliphatic acid is added to complete the esterification to the desired degree. A relatively pure product ester is obtained from the crude reaction product by concentration, filtration, and washing of the filtrate. Work-up of the product into a pure form can be accomplished by conventional procedures.

One of the most important characteristics of a good polymerizable plasticizer for use in vinyl chloride plastisols is the ability to provide plastisols that are stable with respect to changes in viscosity in the presence of peroxidic catalysts and which are initially of fairly low viscosity. It is in this respect that the esters of the invention are outstanding. This can be shown by comparing the viscosity stabilities of a plastisol containing an ester of the invention with a plastisol containing trimethylene glycol dimethacrylate, one of the plasticizers recommended by the prior art. The two plastisols to be compared were formulated as follows:

|  | Plastisol | |
|---|---|---|
|  | A, parts | B, parts |
| Vinyl chloride polymer | 50 | 50 |
| Di(2-ethylhexyl) adipate | 25 | 25 |
| Ester of Example 1 | 25 |  |
| Trimethylene glycol dimethacrylate |  | 25 |
| Bis($\alpha,\alpha$-dimethylbenzyl) peroxide | 0.25 | 0.25 |

Both plastisols were allowed to age at room temperature with viscosity measurements being taken at predetermined intervals. The stability data obtained are as follows:

|  | Viscosity in Centipoises | | | |
|---|---|---|---|---|
|  | Initial | 3 Days | 22 Days | 30 Days |
| Plastisol A | 640 | 660 | 720 | 750 |
| Plastisol B | 780 | 2,500 |  |  |

The difference in viscosity stability in favor of the ester of the invention is apparent. Visual observation also showed that plastisol A originally possessed and retained a lighter color than plastisol B.

What I claim and desire to protect by Letters Patent is:

1. A mixed ester of pentaerythritol in which an average of from 0.5 to 2.5 hydroxyl groups are esterified with an acid selected from the group consisting of acrylic acid and methacrylic acid, and an average of from 1.5 to 3.5 hydroxyl groups are esterified with an alkanoic acid having from 4 to 8 carbon atoms.

2. A mixed ester of pentaerythritol in which an average of from 0.5 to 2.5 hydroxyl groups are esterified with an acid selected from the group consisting of acrylic acid and methacrylic acid, and an average of from 1.5 to 3.5 hydroxyl groups are esterified with butyric acid.

3. A mixed ester of pentaerythritol in which an average of from 0.5 to 2.5 hydroxyl groups are esterified with an acid selected from the group consisting of acrylic acid and methacrylic acid, and an average of from 1.5 to 3.5 hydroxyl groups are esterified with caproic acid.

4. A mixed ester of pentaerythritol in which approximately 1.2 hydroxyl groups are esterified with methacrylic acid and about 1.8 hydroxyl groups esterified with butyric acid.

References Cited in the file of this patent

UNITED STATES PATENTS

| 1,990,483 | Graves | Feb. 12, 1935 |
| 2,381,247 | Barth et al. | Aug. 7, 1945 |